United States Patent
Rhyne, Jr.

[15] 3,671,863
[45] June 20, 1972

[54] SOLID STATE METER RELAY

[72] Inventor: Earl C. Rhyne, Jr., Millis, Mass.

[73] Assignee: Sola Basic Industries, Inc., Milwaukee, Wis.

[22] Filed: Feb. 4, 1970

[21] Appl. No.: 8,653

[52] U.S. Cl. ..........................................................324/157
[51] Int. Cl. ..........................................................G01r 1/30
[58] Field of Search ..........................................324/140, 157

[56] References Cited

UNITED STATES PATENTS

| | | | |
|---|---|---|---|
| 3,290,593 | 12/1966 | Crowdes | 324/157 X |
| 3,135,918 | 6/1964 | Bergson | 324/140 |

*Primary Examiner*—Alfred E. Smith
*Attorney*—Smythe & Moore

[57] ABSTRACT

A meter relay in which the mechanical contacts on the meter of a mechanically operating type of relay are replaced by solid state circuitry. The circuitry is readily adjustable by a simple potentiometer of rheostat to operate an indicating signal and/or a control for industrial apparatus or the like at any desired point over the entire range of a meter. The circuitry is operative, however with or without a meter. A plurality of identical circuits mounted on separate panels or modular units may be ganged to operate different indicators and/or controls at a plurality of points over the range of one or more relay meter devices.

6 Claims, 2 Drawing Figures

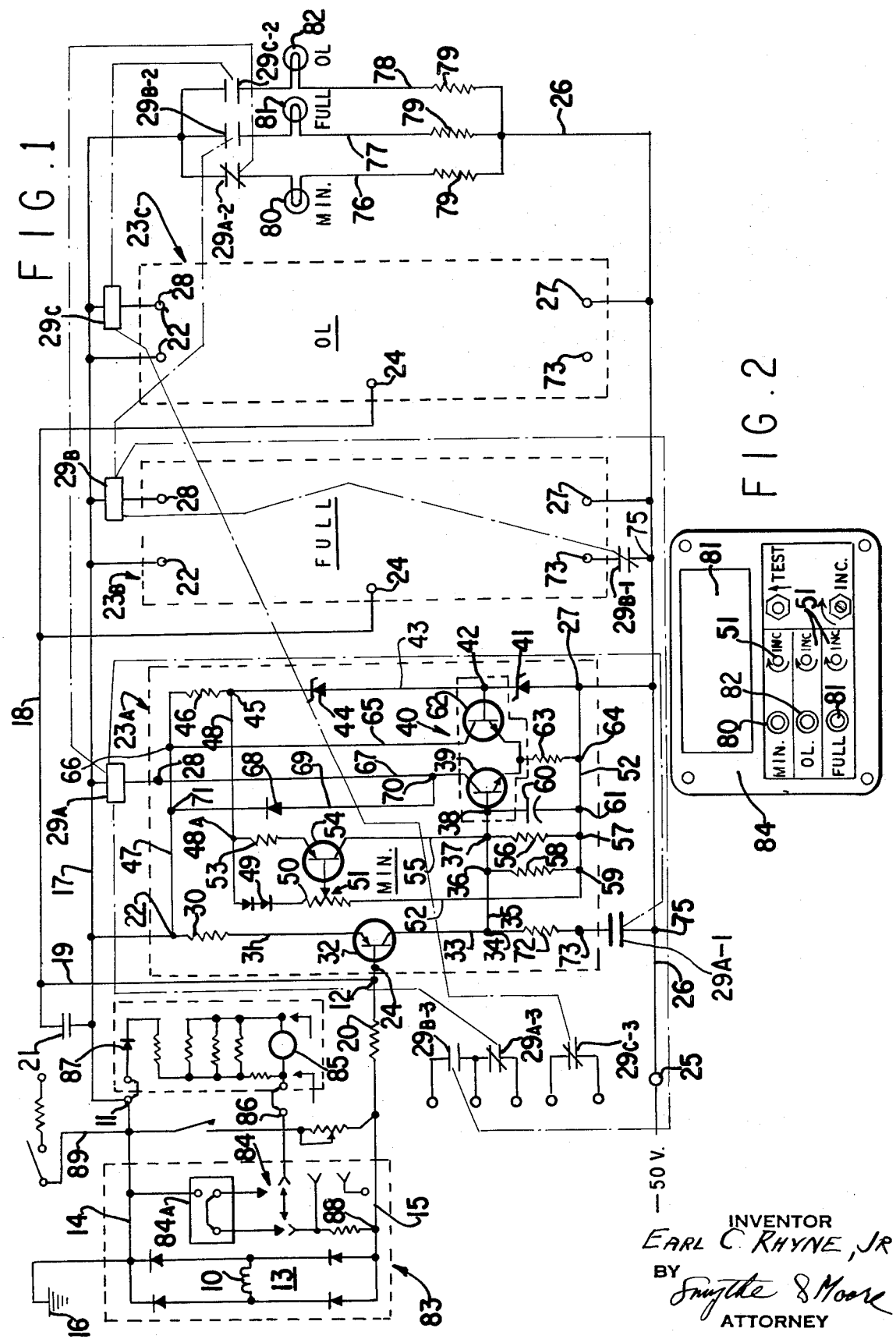

SOLID STATE METER RELAY

This invention relates to meter relays and, more particularly, to a meter relay employing solid state components in place of mechanically operated contacts on the meter.

Ammeter relays are widely used for operating signal lights and/or controlling the operation of industrial equipment such as battery chargers for telephone systems. Such relays, however, have been of the electro-mechanical type wherein contacts on the movable element of the meter engage contacts adjustably mounted on a fixed member to effect the desired control and/or signal indications. In accordance with the present invention, the contacts of the mechanical contacting type of relay are replaced by solid state circuitry whereby cost, size, maintenance and difficulties of adjustment are decreased and reliability is greatly increased. Such circuitry may be used either with or without a common ammeter, voltmeter, or like instrument, and in multiple units so that different indicating and/or operating points over the range of a meter may be obtained.

An object of the present invention is to provide improved meter relay wherein the contacts of a mechanically contacting type of relay are replaced by circuitry employing solid state components.

A further object is to provide a meter relay in which the utilization of mechanically operated contacts on the meter is avoided.

A further object is to provide a meter relay employing solid state circuitry in which the operating points (the current, voltage or the like at which the relay operates) may be readily and simply varied or adjusted over the full range of a meter or the full load capacity of a load circuit.

A further object is the provision of a meter relay in which a plurality of substantially identical circuits provide different readily adjustable indicating and/or operating points for the relay.

A further object is to provide a meter relay circuitry which may be utilized with or without a common type of ammeter, voltmeter or like instrument.

Another object is to provide a meter relay circuitry which may be utilized in multiple units to provide different indicating and/or operating points over the entire range of one or more meter relay devices.

In one aspect, the invention comprises a sensing device such as a current transformer which produces a signal which is proportional to a variable (current, voltage, or power, for example) of a load circuit such as a power line in a battery charger for a telephone system. This signal is fed to a solid state circuitry which replaces the mechanical contacts of the commonly used mechanically contacting type of meter relay and provides for operating a relay when the sensed variable of the load circuit reaches a predetermined value or magnitude. A simple potentiometer or rheostat connected in the solid state circuitry provides for the ready adjustment of the point at which the relay is operated over the full range of the load capacity of the load circuit. The relay may be connected to operate any desired circuitry, such as the circuit of an indicating lamp or signal and/or a control for industrial equipment such as the aforementioned battery charger.

In a second aspect of the invention, a plurality of identical solid state circuits mounted on separate panels or modular units and each having an adjusting rheostat are connected to the signal producing sensor in parallel with each other. Each of the circuits operates a different relay connected to different indicators and/or control circuits. The several circuits are adapted to be set or adapted to be set or adjusted by their respective rheostats to operate the associated relays at different values or magnitudes of the load circuit variable or being sensed. Thus, for example, three such units may be employed to operate at a "minimum load" "full load," and a predetermined "overload" in a single meter relay device, or two units may be used to operate at a "low" and "high" load value. If desired, two or more sets of multiple units may be connected to a common signal producing sensor.

In a third aspect of the invention, an indicating meter such as a common ammeter, voltmeter, or like instrument is connected to the signal producing sensor in parallel with the solid state circuitry to provide a continuous visual indication of the magnitude of the load circuit variable being sensed and also to provide for ready adjustment of the set or operating point or points of the solid state circuitry.

The foregoing and other objects, advantages and features of the invention will be apparent from the following description taken in conjunction with the accompanying drawing.

In the drawing:

FIG. 1 is a schematic wiring diagram illustrating an exemplary embodiment of the invention; and FIG. 2 is an elevational view of an indicating and operating panel for the circuit of FIG. 1.

Referring to the drawing and to FIG. 1 in particular, there is shown a coil 10 which is connected to junctions 11 and 12 through a rectifying bridge 13 and conductors 14 and 15 conductor 14 and junction 11 being grounded as indicated at 16. In the illustrated embodiment of the invention, the coil 10 represents the secondary of a current transformer adapted to provide a voltage signal proportional to the current of a load circuit such as the battery charging circuit of a telephone system. The coil 10, however, may be any desired element for producing a voltage or signal proportional to any desired variable of a load circuit such as current, voltage or power. The grounded junction 11 is connected to a lead line 17 while the junction 12 is connected to a line 18 by a conductor 19. A resistance 20 and a capacitance 21 provide a filter for the output of the rectifying bridge 13.

The line 17 connects with a signal input terminal 22 provided on each of a plurality of separate panels or modular units 23A, 23B, and 23C. The junction 12 and line 18 connect with a second signal input terminal 24 on each of the panels 23A, 23B, and 23C. A power terminal 25 provides a voltage (−50 volts d.c. in the illustrated embodiment) to a line 26 which connects with a power input terminal 27 on each of the panels 23A, 23B, and 23C. An outlet terminal 28 on each of the panels is connected to an associated relay 29A, 29B, and 29C, the other side of the relays being connected to the grounded line 17.

Each of the panels or modular units 23A, 23B, and 23C identical solid state circuits, the circuit of panel or unit 23A only being shown in FIG. 1 of the drawing. Referring again to this figure, the terminal 22 is connected through a resistance 30 and line 31 to the emitter of a transistor 32 having its base connected to the terminal 24 and its collector connected through a line 33 to a junction 34. A line 35 connects the junction 34 to a junction 36, a junction 37, a junction 38, and the base of a transistor 39 forming one part or side of a differential amplifier 40. The power input terminal 27 is connected through a Zener diode 41, a junction 42, a line 43, and a second Zener 44 to a junction 45, and thence through a resistance 46 and line 47 to the terminal 22. The junction 45 is connected through a line 48, a junction 48A, temperature compensating diodes 49, the resistance element 50 of a slide wire potentiometer or rheostat 51, and a line 52 to the terminal 27. The junction 48A is connected through a resistance 53 to the emitter of a transistor 54 having its base connected to the arm of the potentiometer 51 and its collector connected to the junction 37 through a line 55. The junction 37 is connected to the line 52 through a' resistance 56 and junction 57. A trimming resistance 58 is connected between the junction 36 and a junction 59 on line 52, while a filtering capacitance 60 is connected between the junction 38 and a junction 61 on line 52.

The junction 42 is also connected to the base of a transistor 62 forming the other part or side of the differential amplifier 40 in which the emitters of both of the transistors 39 and 62 are connected to the line 52 through a resistance 63 and junction 64. The collector of transistor 62 is connected by a line 65 to a junction 66 on the line 47. The collector of transistor 39 is connected by a line 67 to the outlet terminal 28 connecting to the relay 29A. A protective diode 68 is connected by a line 69 to a junction 70 on line 67 and a junction 71 on line 47. The junction 34 is also connected through a resistance 72 to an auxiliary terminal 73 provided on each of the panels 23A, 23B, and 23C. The terminal 73 of panels 23A and 23B are connected through contacts 29A–1 and 29B–1 of the respective relays 29A and 29B to the line 26 as indicated at 75. The terminal 73 of panel 23C is left open in the illustrated embodiment.

The lines 17 and 26 also connect to three parallel indicating circuits 76, 77 and 78 comprising the resistances 79, the lamps 80, 81, and 82, and the contacts 29A–2, 29B–2 and 29C–2 operated by the relays 29A, 29B and 29C respectively. The relays 29A, 29B and 29C may also operate contacts 29A–3, 29B–3 and 29C–3 controlling apparatus or equipment supplying the load current or other variable sensed by the coil 10. In a commercial application of the invention, the sensing device 10, bridge 13, solid state circuits 23A, 23B and 23C including the potentiometers or rheostats 51, the relays 29A, 29B and 29C together with certain of their associated contacts, and the indicating lamps 80, 81 and 82 would be positioned within a housing 83 (dashed lines FIG. 1) having a front panel 84 as illustrated in FIG. 2. The housing 83 may also include and (indicated generally by the numeral 84) or have connections for a second meter relay device 84A having a plurality of panels such as 23A. With regard to such commercial application, it should again be noted that the described solid state circuitry provides a replacement for the mechanical contacts of a mechanically operating type of relay and is therefore applicable to an existing meter relay system.

In order to give a continuous visual indication of the load circuit variable being sensed, it is desireable to provide an indicating meter, which, in this case, may be a common type of meter such as an ammeter, voltmeter, or like instrument. This meter also provides an indication for adjusting or setting the operating point of the several solid state circuits whereby such operating points in the several panels or modular units may be adjusted or varied to a desired value by the potentiometers or rheostats 51. Such a meter, in this case an ammeter, is shown at 85 and is connected to the terminal 11 and terminal 86 adapted for connection to a junction 88 on line 15. The meter is connected to terminal 11 through a diode 87 and a network of well-known calibrating resistances. The diode 87 provides for establishing an approximately 0.5 volt bias voltage across the junctions 11 and 88 at very low signal currents, no greater than 50 micro amperes for example, thereby to provide very precise and stable relay operation at very low load currents. Suitable means, not shown except for the components of a line 89, provide for supplying a simulated load current to the meter 85 and panels 23A, 23B and 23C for the purpose of adjusting the set points of the several solid state circuits. The meter 85 is positioned in the window 89 of panel 84.

The operation of the meter relay as above described is as follows. A signal represented by a voltage proportional to a load circuit variable to be indicated and/or controlled such as a current is fed to the signal input terminals 22 and 24 by the sensing device 10 and rectifying bridge 13. This signal controls the operation of the transistor amplifier 32 which generates or produces a current proportional to the applied signal. This current is converted by the resistances 56 and 58 into a voltage which is applied to the base of the transistor 39 of differential amplifier 40. The transistor 54 also provides a current to the resistors 56 and 58, such current being normally constant but adjustable in magnitude or value by the potentiometer or rheostat 51. The current from transistor 54 is thus added to the current from transistor 32 thereby to produce a voltage drop across resistances 56 and 58 which is equal to the sum of the respective IR drops. This voltage is applied to the base of transistor 39 connected to the transistor 62 so as to operate as a differential amplifier.

In the meantime, the base of transistor 62 is provided with a constant voltage through the Zener 41, thereby to provide a reference voltage and current for the differential amplifier 40.

So long as the voltage generated across the resistances 56 and 58 from the sum of the currents from the transistors 32 and 54 is less than that applied to the base of transistor 62, the transistor 39 remains nonconductive. Once such generated voltage excedes the latter voltage, however, transistor 39 becomes conductive and operates the associated relay 29A. The point at which the relay operates depends upon the value or magnitude of current from transistor 54 which, although normally constant, may be readily and simply varied by an adjustment of the potentiometer or rheostat 51. Thus, a relatively large current from transistor 54 requires only a small current from signal transistor 32, whereas a smaller current from the transistor 54 requires a larger current from transistor 32. By adjusting the potentiometers 51, the several circuits of the panels 23A, 23B and 23C may be caused to operate their respective relays 29A, 29B and 29C at any desired value of a load current, for example.

Thus, in a battery charging of other apparatus having a maximum rated output of 1,000 amperes, the "Minimum" panel 23A may be set to operate at 40 amperes, the "Full" panel 23B at 800 amperes, and the "overload" panel 23C at 850 amperes. The purpose of the "Overload" panel in the illustrated embodiment is to provide a time delay in the operation of a circuit breaker or the like during transient periods caused by switching other apparatus into and out of the load circuit. Alternatively, a panel such as 23A may be adjusted to operate at a "low" (25 percent or 200 amperes, for example) and a panel 23B at a "High" (75 percent or 600 amperes, for example), or such circuits may be combined with those of FIG. 1 as indicated at 84, the high impedance at terminal 24 permitting the addition or ganging of a number of such circuits.

As indicated in FIG. 1, the relay contacts 29A–2 are normally closed so as to light the lamp 80 so long as the load current or the like sensed by the panel 23A remains below a desired set value. The contacts 29B–2 and 29C–2, on the other hand, are normally open so as to light the lamp 81 and 82 when the load current or the like exceeds predetermined values. The contacts 29A–1 and 29B–1 provide for decreasing the drop-out current of relay 29A and increasing the pull-in current of relay 29B. Thus, for example, without such re-calibrating circuits, the difference between pick-up and drop-out may be 20 amperes. Operation (closing) of the contacts 29A–1 reduces this spread to about 15 amperes, whereas opening of the contacts 29B–1 increases the spread to about 30 amperes. The contacts 29A–3, 29B–3 and 29C–3 may be normally open or closed depending upon the apparatus to be controlled, the position illustrated being for a commercial battery charger.

While the circuit shown is exemplary of a meter relay for a battery charger in a telephone system wherein it is usual to provide a grounded positive and an ungrounded negative, it will be apparent that the invention is applicable to any desired load circuit and that, among other aspects, the polarity of the lead lines may be changed by changing the type of transistors utilized.

What is claimed is:

1. In a meter relay, the combination comprising means for producing a signal proportional to a variable of a load circuit, a relay means, solid state circuit means for replacing contacts of a mechanical-contacting type of relay and providing for operating said relay means at a predetermined value of said load circuit variable, said circuit means including manually adjustable means for changing the value of said load current variable at which said relay is operated over substantially the full range of variations in the load circuit variable, means connecting said signal producing means to said solid state circuit means, means connecting said solid state circuit means to said relay means, and means including contacts operated by said relay provide for changing either the drop-out or pull-in current of said relay.

2. The combination defined in claim 1 wherein said means for changing said drop-out or pull-in currents includes a comparator means and means connected in said solid state circuit means for varying an input to said comparator means.

3. A circuit for meter relay which includes a pair of input terminals for receiving a signal voltage proportional to a variable characteristic (parameter) of a load circuit, means for generating a current proportional to said input signal connected to said input terminals, means connected to a power input terminal for producing a current of constant magnitude, a comparator means, means connected to said power input terminal for applying a voltage of fixed amplitude to said comparator means, means for converting the sum of said currents into a voltage, means for applying said last named voltage to said comparator means, and means for varying the value of said current of constant amplitude.

4. A meter relay circuit as defined in claim 3 in which said proportional current generating means and said constant current producing means comprise solid state amplifiers, said comparator means comprises a pair of solid state devices connected to operate as a differential amplifier, said converter means comprises a resistance means connected in the circuits of said proportional and constant currents, and said means for varying the constant current value comprises a variable resistance connected to provide a variable potential to a control element of said constant current solid state amplifier.

5. A meter relay circuit comprising terminals for receiving an input signal voltage, a power input terminal, and an output terminal, a transistor amplifier connected to said signal receiving terminals, said amplifier providing a current proportional to said signal voltage, a second transistor amplifier connected to said power terminal for providing a current of constant magnitude, control means for said second amplifier comprising a variable resistance means for varying the magnitude of said constant current, resistance means for converting the sum of said currents into a variable voltage, a pair of transistors connected for operation as a differential amplifier, means connected to said power terminal for applying a fixed voltage to one of differential amplifier transistors, means for applying said variable voltage to the other of said differential amplifier transistors, and means for connecting said other transistor to said output terminal.

6. In a meter relay, the combination comprising means for producing a signal proportional to a variable of a load circuit, a relay means, solid state circuit means for replacing contacts of a mechanical-contacting type of relay and providing for operating said relay means at a predetermined value of said load circuit variable, said solid state circuit means including manually adjustable means for changing the value of said load circuit variable at which said relay means is operated over substantially the full range of variations in the load circuit variable, means connecting said signal producing means to said solid state circuit means, an indicating meter connected to said signal producing means, said adjusting means providing for varying the relay means operating point of said solid state circuit means over substantially the full range of said meter, and a diode for providing a stabilizing bias voltage across the load circuit variable so that said relay means will operate at low values of said load circuit variable.

* * * * *